(12) United States Patent  
Gidugu

(10) Patent No.: US 8,977,693 B2  
(45) Date of Patent: Mar. 10, 2015

(54) BROWSER BASED APPLICATION DEVELOPMENT FRAMEWORK

(75) Inventor: Soma Gidugu, Edison, NJ (US)

(73) Assignee: Mindware, Inc., Edison, NJ (US)

( * ) Notice: Subject to any disclaimer, the term of this patent is extended or adjusted under 35 U.S.C. 154(b) by 160 days.

(21) Appl. No.: 13/095,125

(22) Filed: Apr. 27, 2011

(65) Prior Publication Data

US 2011/0264754 A1 Oct. 27, 2011

Related U.S. Application Data

(60) Provisional application No. 61/328,196, filed on Apr. 27, 2010.

(51) Int. Cl.
*G06F 15/16* (2006.01)
*G06F 9/44* (2006.01)

(52) U.S. Cl.
CPC ...................................... *G06F 8/36* (2013.01)
USPC .......................................................... 709/206

(58) Field of Classification Search
USPC ......... 709/206, 204, 205, 201–203, 217–219, 709/223–226; 715/734–736, 761–763
See application file for complete search history.

(56) References Cited

U.S. PATENT DOCUMENTS

| | | | | |
|---|---|---|---|---|
| 7,343,550 | B2 * | 3/2008 | Saidenberg et al. | 715/736 |
| 2006/0031850 | A1 * | 2/2006 | Falter et al. | 719/320 |
| 2006/0265231 | A1 * | 11/2006 | Fusaro et al. | 705/1 |
| 2008/0244582 | A1 * | 10/2008 | Brown et al. | 718/100 |
| 2009/0037829 | A1 * | 2/2009 | Sun et al. | 715/762 |
| 2009/0182844 | A1 * | 7/2009 | Barton et al. | 709/219 |
| 2010/0031167 | A1 * | 2/2010 | Roytman | 715/760 |

* cited by examiner

*Primary Examiner* — Ruolei Zong
(74) *Attorney, Agent, or Firm* — Jordan IP Law, LLC

(57) ABSTRACT

A system, method, and/or machine readable medium including a set of stored instructions that, if executed by a processor, may cause one or more computers to receive user input via a platform independent web-based interface, wherein the user input is to identify application logic and one or more data repositories. The instructions can also cause one or more computers to generate a reusable web service based at least in part on the user input, and construct an application workflow based at least in part on the reusable web service. As a result of usage of such a web-based application development platform, users can create/assemble/generate both traditional & non-traditional software applications/services to perform a specific business functions or operations. Moreover, non-traditional software components are sharable web services, which can be used to create/generate a composite application.

20 Claims, 9 Drawing Sheets

BROWSER BASED APPLICATION DEVELOPMENT FRAMEWORK

CROSS-REFERENCE TO RELATED APPLICATIONS

The present application claims the benefit of priority to U.S. Provisional Patent Application No. 61/328,196 filed Apr. 27, 2010.

BACKGROUND

Businesses in today's competitive environment can frequently face the challenges of having to offer more with fewer resources. For example, businesses may be under pressure to deliver goods and services to the market at a faster, cheaper rate and at higher quality than in previous times. As business process automation continues to grow across the corporate, government, and defense sectors, enterprise agility can be crucial.

For a product or service to be successful and valuable to the enterprise, it can be important for the speed and agility of IT (information technology) operations implementing and integrating process automation components associated with the product or service to match the speed and agility of business analysts redesigning the process. This implementation speed and agility can occur more readily if process implementation and integration can become independent of specific information resources and specific automation applications.

BRIEF DESCRIPTION OF THE DRAWINGS

The various advantages of the embodiments of the present invention will become apparent to one skilled in the art by reading the following specification and appended claim, and by referencing the following drawings, in which:

FIG. 8 is a screenshot of an example of a read e-mail agent interface according to an embodiment;

FIG. 9 is a screenshot of an example of a send e-mail agent interface according to an embodiment;

DETAILED DESCRIPTION

Figure 1:
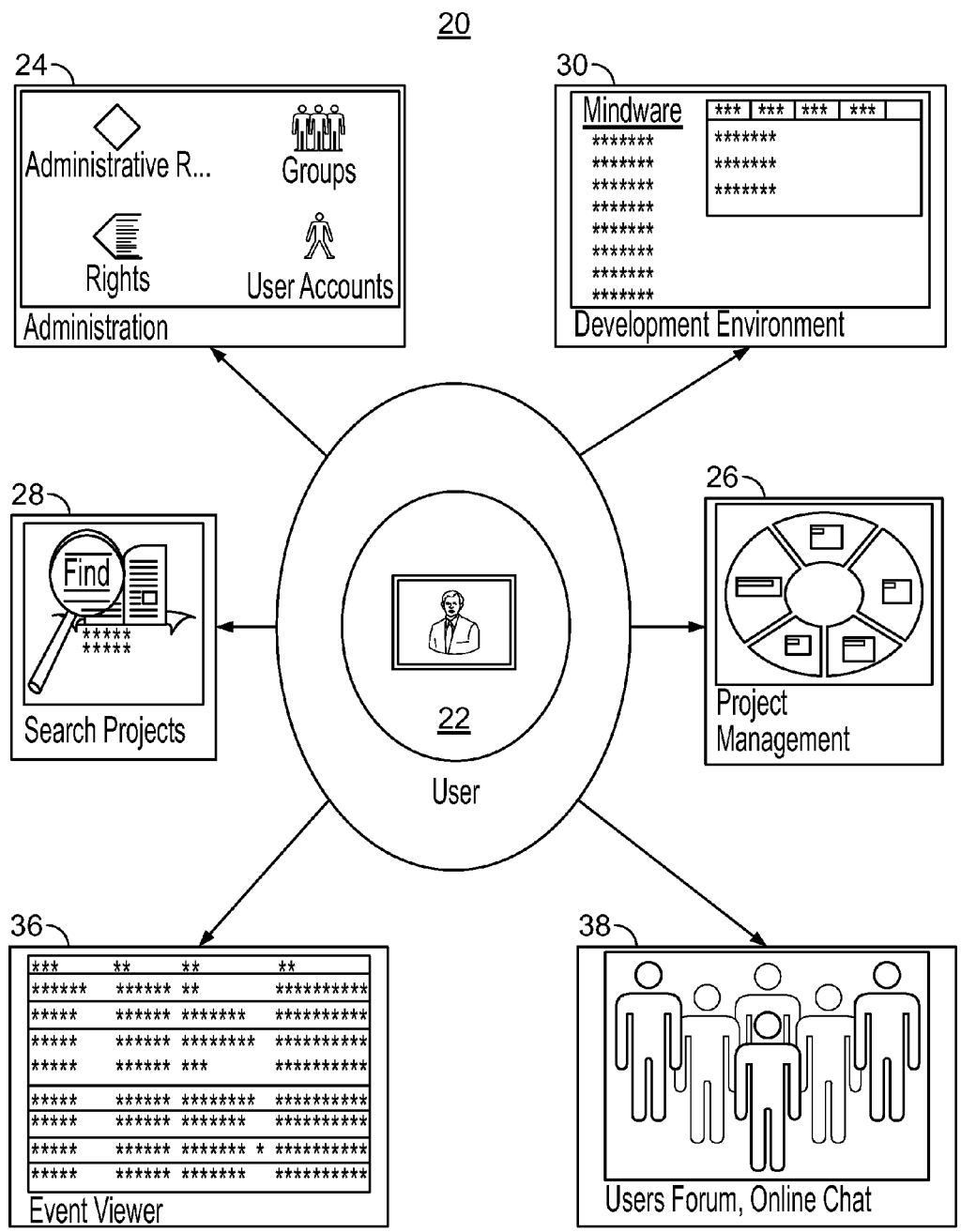
FIG. 1 is a block diagram of an example of an application development framework according to an embodiment.

Embodiments of the present invention may provide for a system, method, and/or machine readable medium including an application stored thereon that, if executed by a processor, causes a computer to deploy a reusable web service, wherein the reusable web service is to construct a plurality of different business applications based on development input.

Embodiments may also involve a method in which a user is prompted for input and user input is received via a platform independent web-based interface. The user input can identify application logic, a plurality of different types of data repositories, and access permission information corresponding to the plurality of different types of data repositories. A reusable web service may be generated based at least in part on the user input, and a plurality of different application workflows can be constructed based at least in part on the reusable web service.

Other embodiments may include a machine readable storage medium having a set of instructions which, if executed by a processor, cause a computer to receive user input via a web-based interface, wherein the user input is to identify application logic and one or more data repositories. The instructions can also cause a computer to generate a reusable web service based at least in part on the user input, and construct an application workflow based at least in part on the reusable web service.

In addition, embodiments can include a system having a processor and a machine readable storage medium with a set of instructions which, if executed by the processor, cause the system to receive user input via a web-based interface. In one example, the user input is to identify application logic and one or more data repositories. The instructions may also cause the system to generate a reusable web service based at least in part on the user input, and construct an application workflow based at least in part on the reusable web service.

Solutions described herein relate to a software application development environment that makes the user feel comfortable to develop web applications with much ease and without any knowledge of coding (e.g., calling objects, object-oriented programming system/OOPS, remembering syntax and reproducing, etc). These solutions can include a web-based development application that provides a workspace for constructing workflows (e.g., applications or projects) required for solving business problems. The browser-based framework may manage, execute and save the constructed workflow on a remote server via a browser based user Interface. The web-based application can allow enterprises and developers to automate their business processes, collaborate across the globe and across business domains. Applications developed by one member (e.g., user or developer) can be instantly available to the other members of the enterprise regardless of geographic location. No software deployments or installations may be necessary. For example, members who are business users or business analysts can successfully develop an application in this environment without any programming knowledge (e.g., no programming skills are required).

In one example, a browser-based application development interface is implemented via a set of intelligent services with easy-to-use point-and-click or drag-and-drop interfaces. These services help orchestrate an application to solve a typical business problem as a workflow, similar to the way a business plan might be drawn on paper. The assembled workflow can be saved as a web service into a service repository on a cloud environment (private or public). Tools may be available within the framework for the members to discover the various kinds of services available, what parameters may be needed to be passed on to the web server and what will be returned from the web server. Additional users can also create web services that may be used within existing web services.

The time and expense of lengthy hours of program coding associated with conventional techniques can therefore be eliminated. Accordingly, relief from routine application development and maintenance for dreary, repetitive business processes can be achieved. The browser based framework can deliver a one-step solution for business process management, application development and integration, and service oriented architecture. The framework's fundamental characteristics may allow the user to:

Create an automated a business process without any programming knowledge

Apply custom business rules and logic

"Assemble" applications on the fly without any program coding knowledge

Utilize fewer resources, thus saving time and reducing programming costs

Reduce human error/omissions

Adapt quickly to changes in data source formats

Acquire data from multiple sources without programming

On example of the framework—a browser based web application (e.g., thin client) interface—provides a platform to integrate/develop individual business application processes. It can use a unique service-oriented architecture (SOA) approach and an easy to navigate kind of an environment with a user-friendly interface that makes its intended audience feel at ease. The framework can include individual software services that can be re-used within the context of multiple business processes. The SOA-based approach may be observed as a set of design principles that can be applied to the design of both computing assets and process assets. The SOA-based approach can also separate functions into distinct units or services that developers make accessible over a network so users can combine and reuse them in the production of business applications. These services may communicate with each other by passing data from one service to another, or by coordinating an activity between two or more services.

The framework may therefore facilitate the transition from model to reality. Well designed and continuously improved process models can be implemented in the real world by actual employees interacting with real software applications, which can be integrated with real integration platforms.

Business process management (BPM) may be a systematic approach to improving an organization's business processes. BPM activities can therefore seek to make business processes more effective, more efficient, and more capable of adapting to an ever-changing environment. In addition, BPM software can drive the process flow and support process parallelism, so that independent sequences of work can be performed concurrently in isolation of each other, with their results being merged and synchronized later in the flow.

Particularly advantageous aspects of solutions described herein may include, but are not limited to:

No Software Installation is required.

Knowledge of routine coding languages for programming can be avoided.

Intelligent agents/services-based environment.

Complete browser based application (Web Application).

Assembled workflows offered as web services.

Facility to generate Assembly files (e.g., dynamic linked library/dll for usage within the visual studio environment).

Automated, efficient process flow is facilitated.

Increased productivity and decreased development time.

Formalization of existing processes and identification of needed improvements.

Reusable-shared services are built without making any assumptions of who (e.g., portal or another service) will consume these services.

Functionality can be organized as a set of modular, reusable-shared services (e.g., ability to provide access specification).

Traditionally, micro level programming may have meant writing code or applications at the processor level in hexadecimals, and macro level programming might have indicated writing/coding at higher level languages. In terms of the techniques described herein, micro level programming could involve using the classes, objects or dll files to develop an application (e.g., writing code, creating objects and plan logic to implement some functionality). The application development framework described herein, on the other hand, can include agents/services, which themselves may include logical building blocks of functionality from ground level to the top. Such an approach can assist the user in a number of ways to achieve the desired functionality. Thus, in this sense, macro level might involve the user configuring the agents/service according to his or her needs and using the agents directly. Agents can therefore have precompiled logic that acts as an aid for application development.

Any required component/functionality can therefore be developed by using either Java, C++ or any other programming languages in their respective development environments, wherein the application development framework described herein may provide the programming logic as components/services that the user configures according the requirements of the particular situation. Such an approach could be considered as macro level reuse, whereas developing the application from scratch using traditional programming languages might be considered micro level programming. In the architecture described herein, the software designer may assume that the application will be integrated, that a common way to share different types of information and transactions between applications exists, and that there is a common information bus to transport that information between applications. Simply put, this style of architecture promotes web service reuse at the macro (service) level rather than the micro (component) level.

In addition, this approach can effectively eliminate redundancy while simultaneously accelerating the delivery of projects through consolidation and the reuse of services, which are often referred to as web services. As a result, IT can become more efficient and allow for quicker project delivery as well as shorter cycles.

A unique project development environment may therefore provide comprehensive facilities for application development. This environment may include various agents/services available where a user without any programming knowledge can plan a project and start an application that resembles an algorithm writing environment that might occur before any application development takes place. In such an environment, the steps involved in building an intelligent algorithm may be embodied in a software application. In addition, compile and run agents can enable a user to compile/run their application from the same browser in which the application is constructed and check the results.

Introduction

Turning now to FIG. 1, an application development framework 20 is implemented as a flexible, powerful application (i.e., "development application") that provides a user 22 with a large number of web-based agents/services, where the user 22 can provide development input, use the web-based services to develop logic in a sequence of steps, and deploy the logic as application (i.e., "developed application" or "project"). The user 22 can also separate some parts of the logic into processes. The developed application can be put to use by other users in other applications as well (e.g., if it is distributed).

Login and Logout

In a login page, the user 22 can be required to enter a user name and password to authenticate the user 22. This may be a common login screen for all users. The logged in user name can be displayed on top right corner of or elsewhere on the screen.

On clicking a log-out link, user session details can be cleared and the user 22 may be redirected to a home page. This button can be provided in all the first level web-pages, but may not be available on the application logic development environment pages. In the application environment, the user 22 only be able to see options such as save application, run application etc.

The login screen may also include a "forgot password" link in which the user 22 can be given an option to increase the security by adding a security question and giving an answer. If a secret question exists, then on the forgotten password screen the secret question can be displayed. Only on after typing correct answer will the user 22 be sent the new password.

Administration

An administration module 24 can be used by administrators to perform administrative functions. For example, an administrator user could add/modify/delete users, workgroups and control permission levels using the administration module 24.

In addition, an authorization process may grant access to activities and data service resources for users. Upon user registration, an administrator may need to approve the user's credentials provide an account to the user.

A developed application administrator can also have access to this screen. Thus, the developed application administrator might add, update and inactivate users. In addition, the developed application administrator can assign roles to the users. In this regard, the system can have role base authorization processes, wherein each user can have an assigned role. An administrator may be the only user that can change the parameters in roles. For example, the system could have following default roles, wherein each can have one role and the system displays screens based on role(s) assigned to the user: general user; application administrator; technical support.

Once the user is registered and provided with the role and specific code to access his account, then the user can update his or her profile. For example, a profile page can maintain the user information.

Projects Management/Maintenance

Distributed Projects—In a project management module 26, project distribution may be implemented. The purpose of project distribution can be to distribute precompiled versions of software packages (e.g., developed projects). The distributed projects can be used by other registered users. Distribution of application code or part of it or the compiled project can be dependent upon the user. In one example, the right to provide permissions for projects can be restricted to only the user who has developed the application.

Saved Projects—This component can be a user repository that includes the projects that are developed/developing projects of the user. Here the user may be provided with several options for categorizing projects.

Generate Web Service—Developed projects and their logic can be exposed to users across the globe via a web service. The generate web service agent in the framework described herein can be used to breed the logic of the project as a web service.

Publish Web Service—The generated web service can be exposed to the public by setting the permissions to the created application. The user who has created the project can publish it and may have the right to give permissions to the users to use it.

Search Projects

Get Available Projects—A search projects module 28 can display all distributed projects. For example, the projects may be listed in alphabetical order of the project names assigned by the developed user. Depending upon the properties assigned to the application, the application might be accessible. The fields/details of the projects may be used to sort the projects.

Search Projects Based On Search Criteria—The search module 28 can also provide an option to find any particular distributed project from the available list of projects. This search may return a project whose descriptive name or description matches the search criteria. The order of the projects returned may be based on their relevance to the criteria entered (e.g., relevance could be calculated by looking at the number of times the search string is found in the name and project description, and by the project's activity ranking). Matches can be sorted based upon this relevance calculation.

An advanced search may also be available in addition to the standard search, wherein the advanced search enables the user 22 to construct more detailed search criteria. This web form may provide several options to limit the search criteria, including selecting specific titles, project registration dates or period, etc.

Project Development

Figure 12:
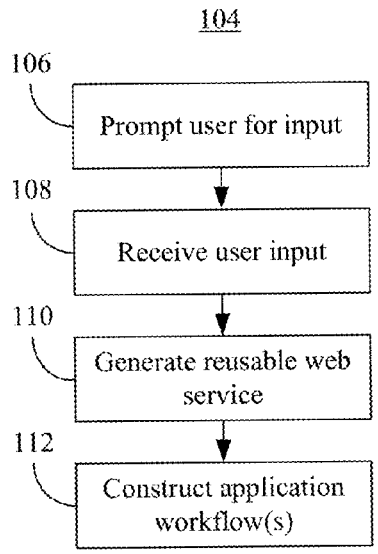
FIG. 12 is a flowchart of an example of a project development method according to an embodiment.

Generally, a project development module 30 can provide an environment in which registered users can develop their applications. FIG. 12 shows a project development method 104 according to one example. The method 104 might be implemented in a machine readable storage medium as a set of instructions which, if executed by a processor, cause a computer to guide a user through an application development process as described herein. Illustrated processing block 106 provides for prompting a user for input. The user input may be received via a web-based interface at block 108, wherein the input can identify application logic (without the user having any programming knowledge), one or more data repositories, and other information relevant to the project being developed. For example, the user input could include web-connector service input, web interaction service input, data assignment service input, comparison service input, grouped management service input, aggregation service input, email management input, database operations service input, and so on. The various types of user input will be described in greater detail below. A reusable web service may be generated at block 110 based at least in part on the user input, and one or more application workflows may be constructed at block 112 based at least in part on the reusable web service.

Thus, the development environment may be a software application that provides comprehensive facilities to users for application development. This environment can include various agents/services available where a user without any programming knowledge can plan a project and start developing logic for application via an interface that resembles an algorithm writing environment that might occur before any application development takes place. In this environment, the steps of building an intelligent algorithm can be implemented into a web-based development application. In addition, compile and run agents can enable users to compile/run their application from the same browser and check the results.

As already noted, users may provide access control to their developed projects. Access to shared resources (e.g., projects) can be limited to modification by the owner only. The access control may be administered at different levels by setting different levels of access, or permissions, to projects such as write, read, or no access. In addition, intelligent agents/services can be browser based web application interfaces, which provide a platform for integrating/developing individual business application processes.

The registered users can view their applications and provide the appropriate permissions/access to their created applications. The users can also create, edit and delete the developed application process. Users may be given permission to incorporate the developed applications of other users into their developed applications. Such a re-used developed application could be recreated in the subsequent project, while not modifiable in the original project. As already noted, an administration module 24 (FIG. 1) might enable an administrator to authenticate a user, select a role and/or work-space for the user, etc.

To use/develop the intelligent agents/services in the project development module 30, an application interface may start with a create application agent, which takes the user to a portal where he or she can provide a name to an application to be developed, an application description, access permissions, title, icon if interested, etc.

Create Workflow—To develop new application workflows in the development environment, users may be required to provide application name, description, permissions, etc., for the module.

Workflow Sub-Process—An application workflow can have any number of sub-processes. A process may simply be a part of the application logic encapsulated under a header (name of the sub-process) and can be called from other processes within the application. Such a process can be called from any part of the project.

Data Connector Service—This service can extract data from databases, files, spreadsheets, etc., depending on the requirements and conditions specified by the application designer (e.g., user input). This service could allow the user to select the type of repository, whether it is a database (e.g., Oracle, Microsoft Access database, or other types of databases), flat file, spreadsheet (e.g., Microsoft Excel), etc. The repository can be any type of database, and the user 22 (FIG. 1) can build the query to extract the required specific value/data.

Web-Connector Service—This service may extract data and business information intelligently from the Web (e.g., HTML/XML sites). The data from the sites can be extracted dynamically based on the user input obtained via the web-based interface. Web methods may be used to perform browser operations within application logic.

Web Interaction Service—This service can involve interaction with the web and may provide the procedural steps for the navigation, from where to gather the information, what information is to extracted, etc. For example, the extract data procedure might be used to extract data from web pages.

Data Assignment and Management Service—This service can set or assign values to variables in many possible ways such as assign value directly, assign value by evaluating an expression, etc.

Comparison Service—A comparison service may be used to sort and then compare data in two data groups. It could automatically sort all fields by aligned columns from the left hand side record and all rows from the right hand side record. It may then automatically run through all rows in both left hand side and right hand side records and detect which key column data values match exactly between the two records.

Grouped Data Management—This service may perform operations on a set of data elements in a record such as moving to a specified field, adding a new field, deleting a field etc., and the following operations can be performed on multi-row records:

Move First: Moves the field pointer to the first row in the record.

Move Previous: Moves the field pointer one field prior to the currently selected field.

Move Next: Moves the field pointer one field ahead of the currently selected field.

Move Last: Moves the field pointer to the last field in the record.

Add New Row: Creates an empty row for a new field to be inserted in the record.

Update Row: Updates changes made to the current row.

Delete Current Row: Deletes the currently selected record.

Delete All Rows: Deletes all rows in the record. If the record is connected o a relational table, then the connected field set is cleared.

Clear All Rows: Deletes all rows in the record. If the record is connected to a relational table, the connected field set is NOT affected. It still contains the originally read data. A commit on this record will not affect the data in the database after this statement.

Move: Moves the field pointer to the specified row, by providing the number of rows to move from the current row.

Sort Service—This service can sort record fields by specified column data values in ascending or descending order for each sort key column.

Publish Service—A Publish service can be used to compose custom-authored HTML web pages. This service may display the content in a web-browser with a specified format.

Manage Spreadsheets—This service may manage data from and to Microsoft Excel or other Spreadsheet applications.

Data Charting—A data charting service may generate charts and graphs as JPG files with provided data fields. The charting service could generate 2-D and 3-D charts, wherein the generated charts can be reused in display agents to display in browsers.

Aggregation Service—This service may generate aggregate information for a record. The following are examples of aggregate operations that might be performed on a record.

Min: Calculates the minimum value of the specified record.

Max: Calculates the maximum value of the specified record.

Sum: Calculates the sum of all the fields specified in the record.

Avg: Calculates the average of all the fields specified in the record.

Count: Calculate the count of all the fields specified in the record.

Email Management—An e-mail agent may be used to read e-mails and send e-mails from a specified server. To use the SMTP server, a valid user-id may be required on the SMTP server. Both TEXT and HTML format e-mails can be sent using this service.

Figures 8, 9:
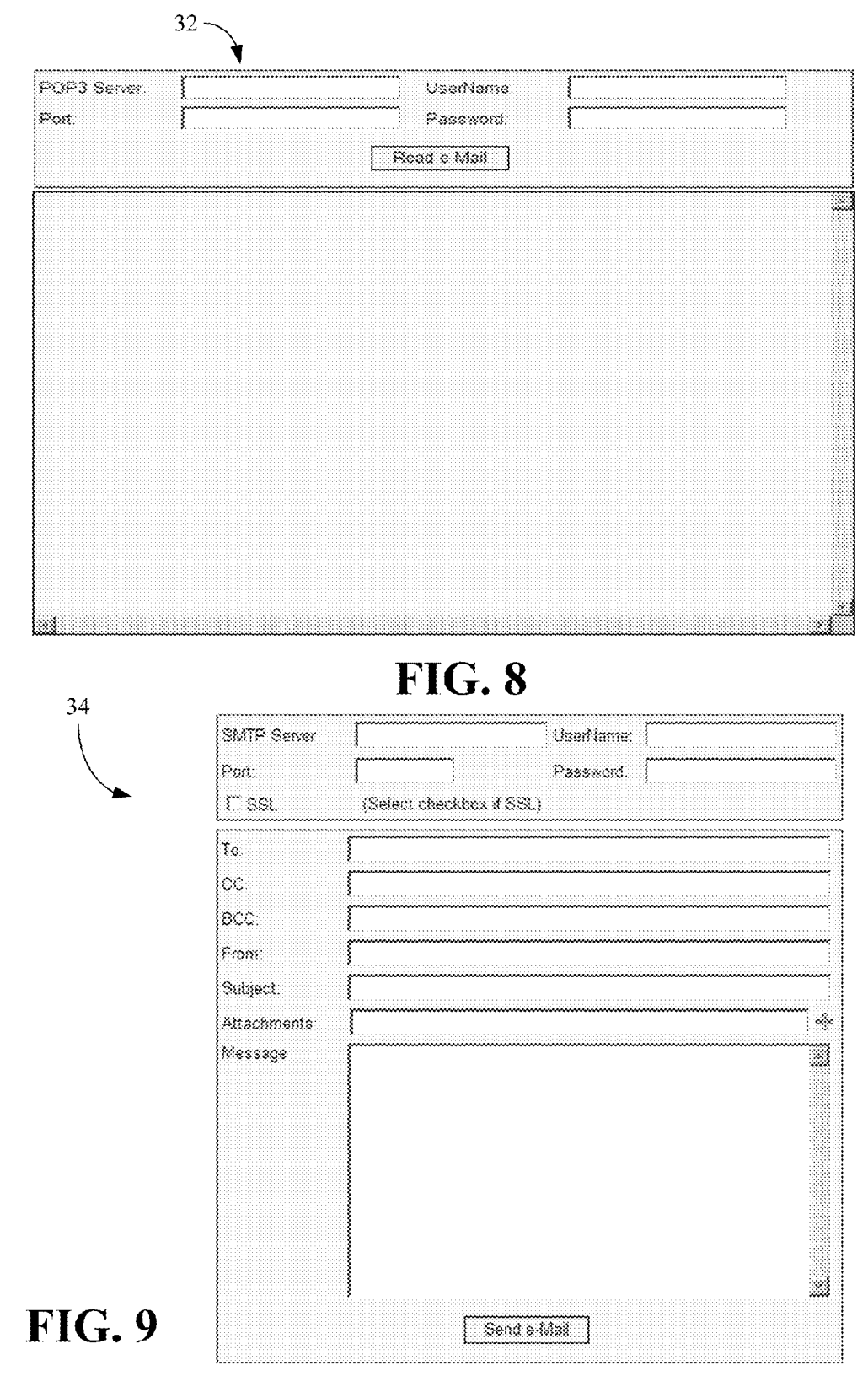

FIG. 8 shows a read e-mail interface 32 that may be used to open and read e-mail from a POP3 (Post Office Protocol—Version 3) server provided by various e-mail providers such as Gmail, Yahoo, etc., for a specified user profile for further use in the application. The POP3 protocol can permit a workstation to dynamically access a mail drop on a server host in a useful fashion. Usually, this means that the POP3 protocol can be used to enable a workstation to retrieve mail that the server is holding for it.

FIG. 9 shows a send e-mail interface 34 that may be used to compose an e-mail and send it to the specified email address using an SMTP (Simple Mail Transfer Protocol) server. An SMTP server might perform the following two functions: 1) verify proper configuration and grant permission to a computer attempting to send a message; and 2) send an outgoing message to a predefined destination and track the successful delivery of the message. If it is not deliverable, a message can be sent back to the sender. The illustrated agent may send email using ports such as port 110 and an SSL (Secured Socket Layer) port.

Execute Program Logic—Returning now to FIG. 1, this service of the project development module 30 may be used to run any programming logic from within the browser environment. For example, this agent may be useful to:

Invoke external program APIs from within the application file logic flow, get a response from a program and continue the application file logic flow.

Invoke APIs of programs that are written in a detailed language (e.g. C#.NET, VB.NET etc.) because of unique capabilities.

Call stored procedures from databases.

Database Operations Service—This service can be used to perform different types of operations on a database from within a browser. Some of the operations might include connect to database, start/commit/rollback transaction, update data in database, execute stored procedures and SQL commands, disconnect from database, etc.

Search Engine Service—A search engine service may search for a phrase, word in a string or in the fields of the records. Here, a number of advanced search options can be introduced in order to make searching easier.

XML Management—This service may manage data from and to XML files from within a browser. It can be used to create an XML file, or to connect/disconnect an existing XML file and perform various operations like create node, insert node, delete node, get data from nodes in the XML file.

String Management Service—A string management service may manage various string manipulation functions such as copy strings, delete string, concatenate strings, find substring in a given string, string length, converting string from lower to upper case and vice versa.

File Management—This service may enable users to conduct simple operations on files from within a browser. The file operations agent might include one or more of the following methods:

Create File: Crates a file in specified format.
Delete File: Deletes a file.
Rename: Renames a file.
Find File Path: To find the path of the specified file.
Convert pdf to Text: This converts the pdf document to text document
Convert text to pdf: This converts the text document to text document Legacy Application Services—A legacy application service may be used to interact with legacy host systems such as IBM Mainframes, AS/400 systems or other older midrange systems or application residing on them. This service could enable the user to send or receive data from these host systems.

Other aspects of the project development module 30 could include a Run Project/Process sub-module in which the user 22 can execute a project by using a Run process agent. Here the user can run an entire project or an individual process. This sub-module could include stop, pause and resume buttons, which allows the user to control the replay process.

Another aspect of the project development module 30 may include a Debug Application sub-module, which could debug the developed application to check for proper syntax and proper functioning of the statements (e.g., configured agents).

The project development module 30 may also include a Check Results sub-module in which the user can check the values in the record fields. This functionality may help the user to identify the expected results.

In addition, the project development module 30 might have a view log sub-module that contains a log file which acts as the monitor for all the projects which are run from the users account. This sub-module could provide the details of the errors which user has faced when the project is run and may be maintained on per-user basis.

Event Viewer

An event viewer module 36 can display application events and system events which serve as an event log within the environment. The illustrated event viewer module 36 may be helpful for the administrator in monitoring all events taking place within the development application, and may behave like a resource for tracing bugs if any, in order to protect the tool from any sort of critical errors, etc.

The XML representation of the event can be viewed in properties. There are a large number of different types of event logs including Administrative, Operational, Analytic, and Debug log types.

Users Online—This sub-module may determine how many registered users there are, and how many are online. This sub-module may also provide the list of the users who are currently online. It could automatically update the users who have logged in by setting refresh for a desired time.

Distinguish Users Based on Role and Location—As already noted, users may be classified as "distinguished" based on their roles and location. The administrator could map the roles to the users. This sub-module might list all the users with different roles, and could provide the user details based on location.

View Events, Users Log—A list of events can be maintained by date and users can view the events occurred by date. A log may also be created for the users containing information about user login date, time and events raised by the users.

Users Forum and Online Chat

A users forum and online chat module 38 can be dedicated to providing online help and discussion about user queries related to application development. Users can share their ideas and technical articles in this forum. Users might be required to subscribe the forum in order to get answers to their queries.

In addition, the online chat functionality of the module 38 may be used to chat between groups of users to each other for sharing information. Users can chat in a public window as well as in a separate private window. Users might also upload files (txt, doc, jpg etc.) in the chat window.

The various modules and services described herein can be combined and/or partitioned along different logical lines as appropriate.

Figure 2:
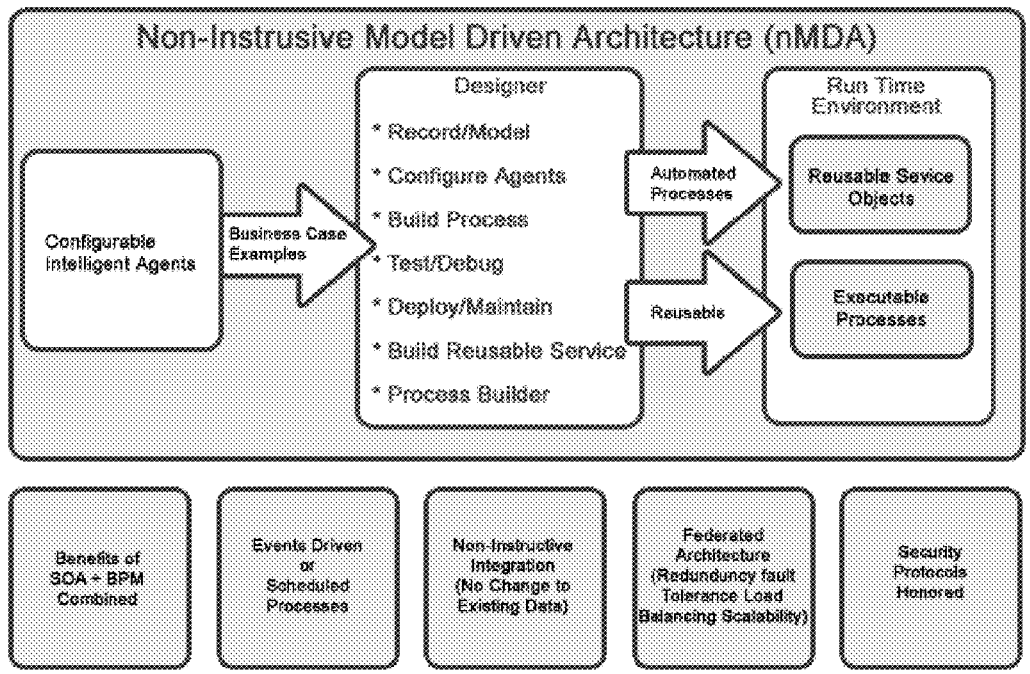
FIG. 2 is a block diagram of an example of a non-intrusive model driven architecture according to an embodiment.

FIG. 2 shows a non-intrusive model driven architecture (nMDA) in which a designer can deploy configurable intelligent agents as reusable, automated processes in a run time environment. Such an approach could be used, for example, to transition an enterprise from numerous, independent IT systems (e.g., acquisition, financial management, human capital management, and logistics IT systems) into a seamless, integrated, web-based environment capable of supporting disparate personnel in accessing and sharing actionable logistics information. This accessing and sharing may be done in real time while automating and augmenting current technology investments and minimizing the expense of human capital.

Example environments in which such collaborative cross organizational value can be realized include, but are not limited to: Fast Sourcing of Products and Spare Parts; Product Life Cycle Collaboration and Monitoring; Transportation Management; Supply Chain Planning and Design; Insurance Fraud Protection, Governance; Global Content Management/ Corporate Knowledge Management; Contracts Management; Asset Management; Real-time Inventory Management; Procurement Workflow; Market Intelligence; Audit/Compliance; and Real-Time Alerts & Monitoring.

In addition, advantageous features of the nMDA 40 may include, but are not limited to: Fully visual modeling environment to develop rule-based custom applications; Send/receive data from legacy, open database connectivity (ODBC, e.g., Oracle, Sybase, SQL Server, DB2, Lotus Notes), enterprise resource planning (ERP) packages, business intelligence (BI) systems, customer relationship management (CRM) packages, EDIs/APIs, files, spreadsheets, PDF files, faxes, emails; Connectivity to 3rd party software and services (supports calling other programs or being called from other programs); Send/receive data from HTML, XML, WML data sources; Nested, multi-level, customizable, business-rule driven web searches; Drawing of charts/graphs from real-time data; Interactive, visual application design environment with instant playback, testing, and debugging; Automatic "self-correcting" deployment of fixes, enhancements or remote machines; 10× faster creation & modification of advanced business intelligence capabilities; Instant connectivity and integration of all corporate data in business decisions and customer assistance; Highly intelligent automated e-mail response solutions; Easy and quick integration of a wide range of business capabilities; Instant context specific connectivity to worldwide partners; Instant integration of newly found, relevant information in decisions; Visualization and quick understanding of business decisions; Instant design, testing, and deployment of new or modified business capabilities; and Effortless deployment and modification of business rules providing crisper decision-making.

Figure 3:
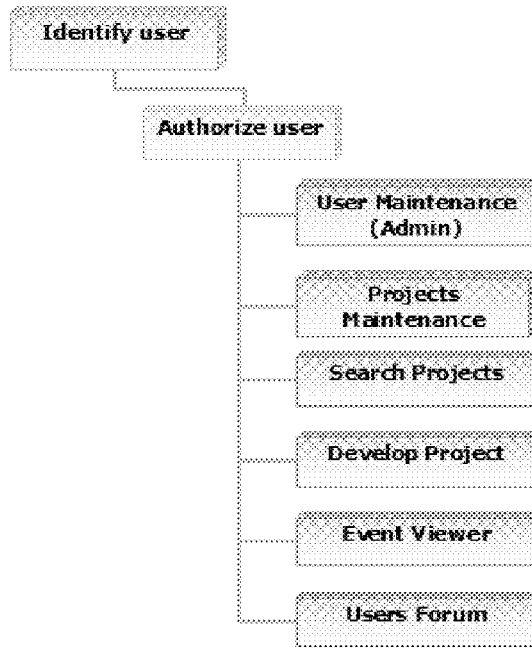
FIG. 3 is a block diagram of an example of a user identification framework according to an embodiment.

FIG. 3 is a block diagram of a user identification framework 42 in which user authentication is conducted prior to permitting access to other functionality such as project development and searching.

Figure 4:
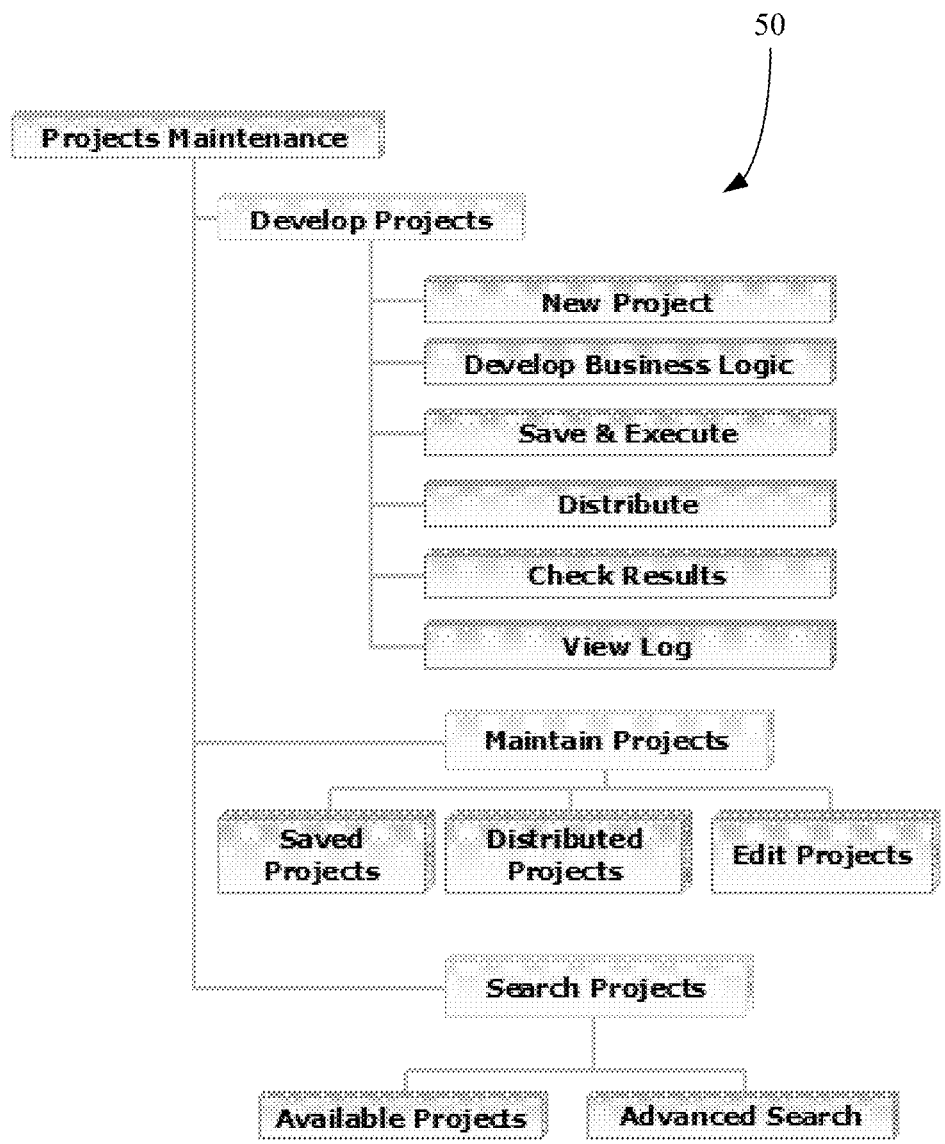
FIG. 4 is a block diagram of an example of a project maintenance framework according to an embodiment.

FIG. 4 is a block diagram of a project maintenance framework 50 from which other functionality such as project development and searching may be accessed.

Figure 5:
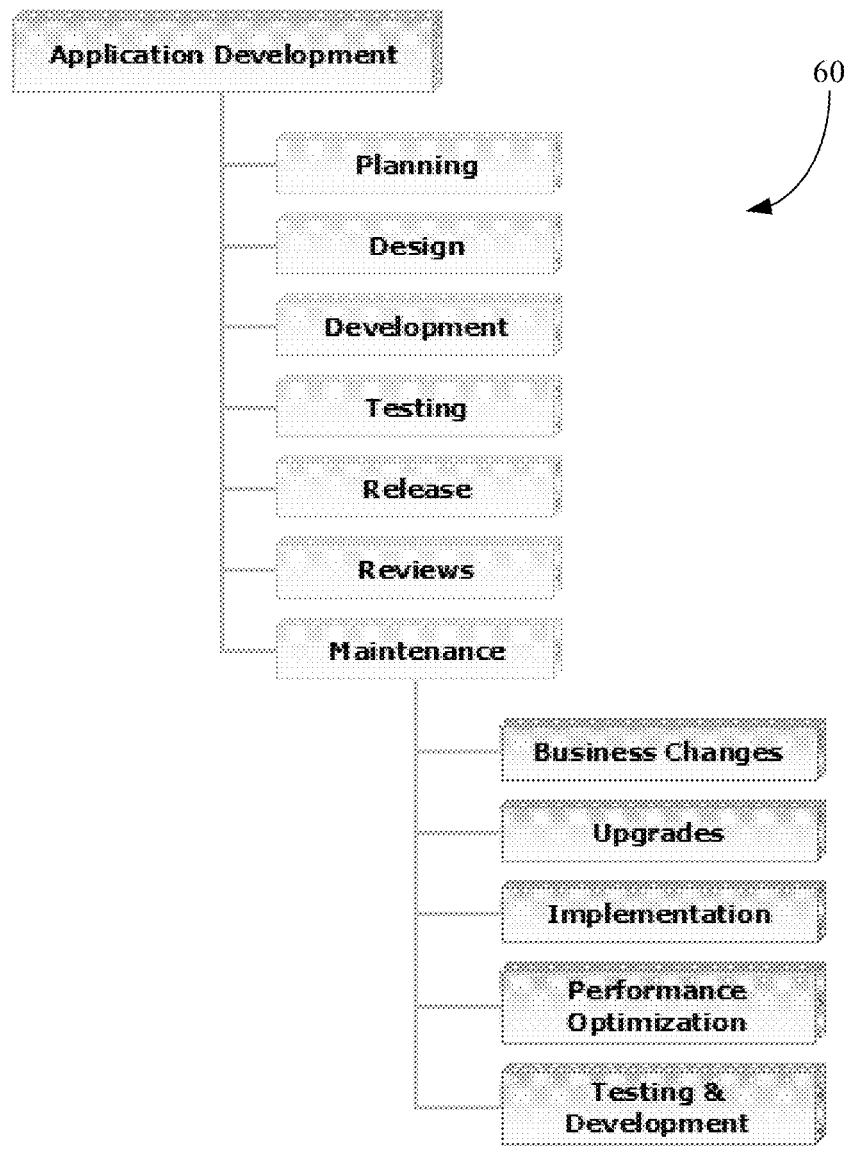
FIG. 5 is a block diagram of an example of an application development framework according to an embodiment.

FIG. 5 is a block diagram of an application development framework 60 that may link the user to pages for planning, design, maintenance, business changes, and so on.

Figure 6:
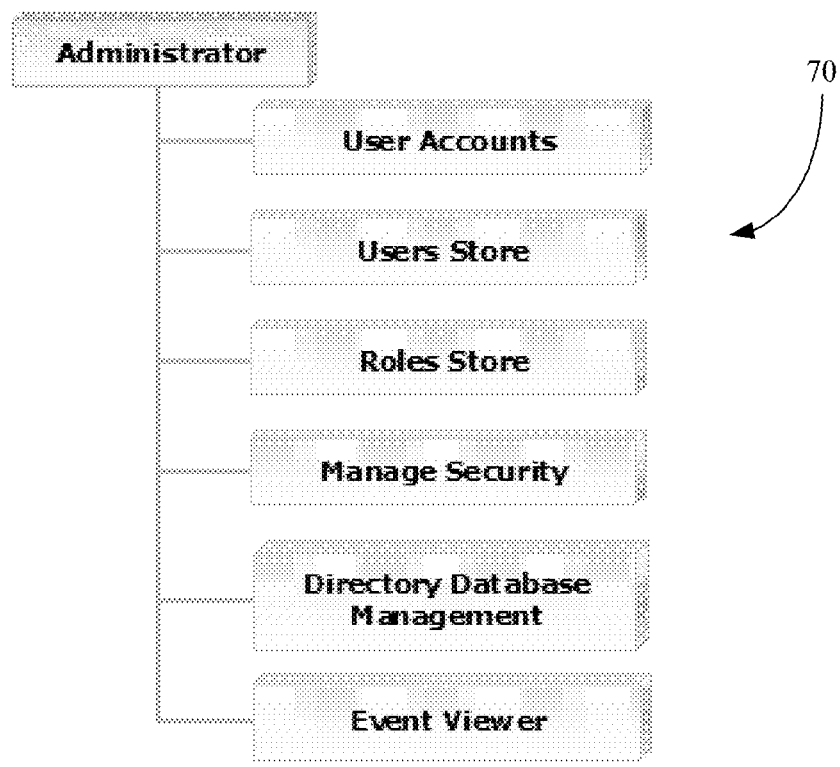
FIG. 6 is a block diagram of an example of an administrator framework according to an embodiment.

FIG. 6 is a block diagram of an administrator framework 70. In the illustrated example, an administrator can access user accounts, a users store, a roles store, a security management interface, a directory database management interface, and an event viewer.

Figure 7:
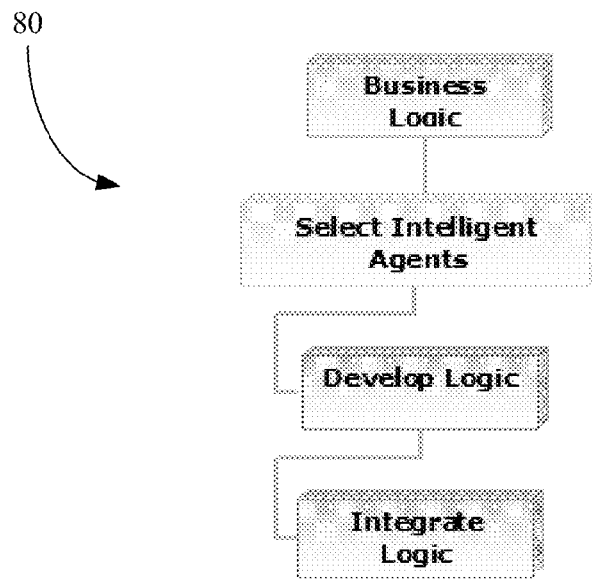
FIG. 7 is a block diagram of an example of a business logic framework according to an embodiment.

FIG. 7 is a block diagram of business logic framework 80. In the illustrated example, business logic is used to select one or more intelligent agents, which may in turn be used to develop logic within the application development framework. In addition, the logic can be integrated into one or more workflow sub-processes.

Figure 10:
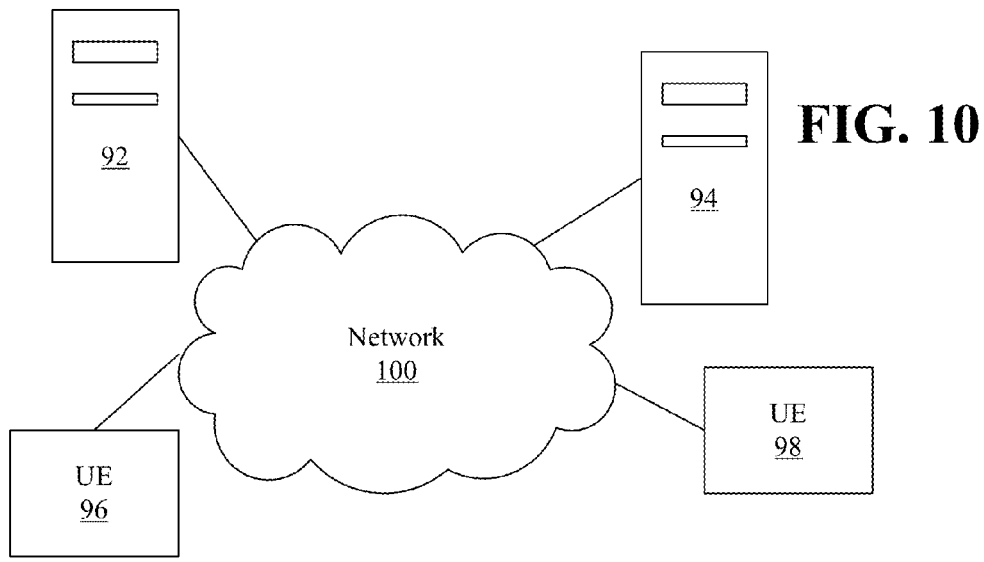
FIG. 10 is a block diagram of an example of a computing architecture according to an embodiment.

Turning now to FIG. 10, an IT system 90 is shown in which one or more servers 92, 94, are interconnected with one or more user equipment (UE) devices 98 via a network 100. In the illustrated example, the UE devices 96, 98, which can have web browsing capability, may include a personal computer (PC), notebook computer, personal digital assistant (PDA), wireless smartphone, or other device having access to the servers 92, 94, via the network 100. The connection of the UE devices 96, 98 to the network 100 may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., or any combination thereof, depending upon the circumstances. The UE devices 96, 98 could be located in the same physical location or in different locations.

In addition, the network 100 can include any suitable combination of servers, access points, routers, base stations, mobile switching centers, public switching telephone network (PSTN) components, etc., to facilitate communication between the UE devices 96, 98 and the servers 92, 94. The servers 92, 94 may be distributed and/or redundant web-based servers that are able to respond to web page requests for content. Thus, the servers 92, 94 can have stored thereon hypertext markup language (HTML) and other markup language-encoded content, as well as databases and applications such as Java and other applications. The servers 92, 94 could also be part of a cloud computing environment in which resources are shared across platforms in a complex fashion.

In one example, each server 92, 94 and/or UE device 96, 98 constitutes a computer product having a computer readable medium with computer usable code stored on the computer readable medium, wherein, if executed by a processor, the computer usable code may cause the server 92, 94 and/or UE device 96, 98 to implement the application development framework 20 (FIG. 1). Thus, the application development framework 20 (FIG. 1) may be implemented in executable software as a set of logic instructions stored in a machine- or computer-readable medium of a memory such as random access memory (RAM), read only memory (ROM), programmable ROM (PROM), flash memory, etc., in fixed-functionality hardware using circuit technology such as application specific integrated circuit (ASIC), complementary metal oxide semiconductor (CMOS) or transistor-transistor logic (TTL) technology, or any combination thereof.

In one example, different components of the IT system 90 may be associated with different aspects of an enterprise. For example, the UE device 96 may correspond to a computing system used by acquisition personnel of an enterprise, whereas the UE device 98 may correspond to a computing system used by logistics personnel of the enterprise. Moreover, the servers 92, 94 might contain disparate data repositories used by various divisions of an enterprise.

Figure 11:
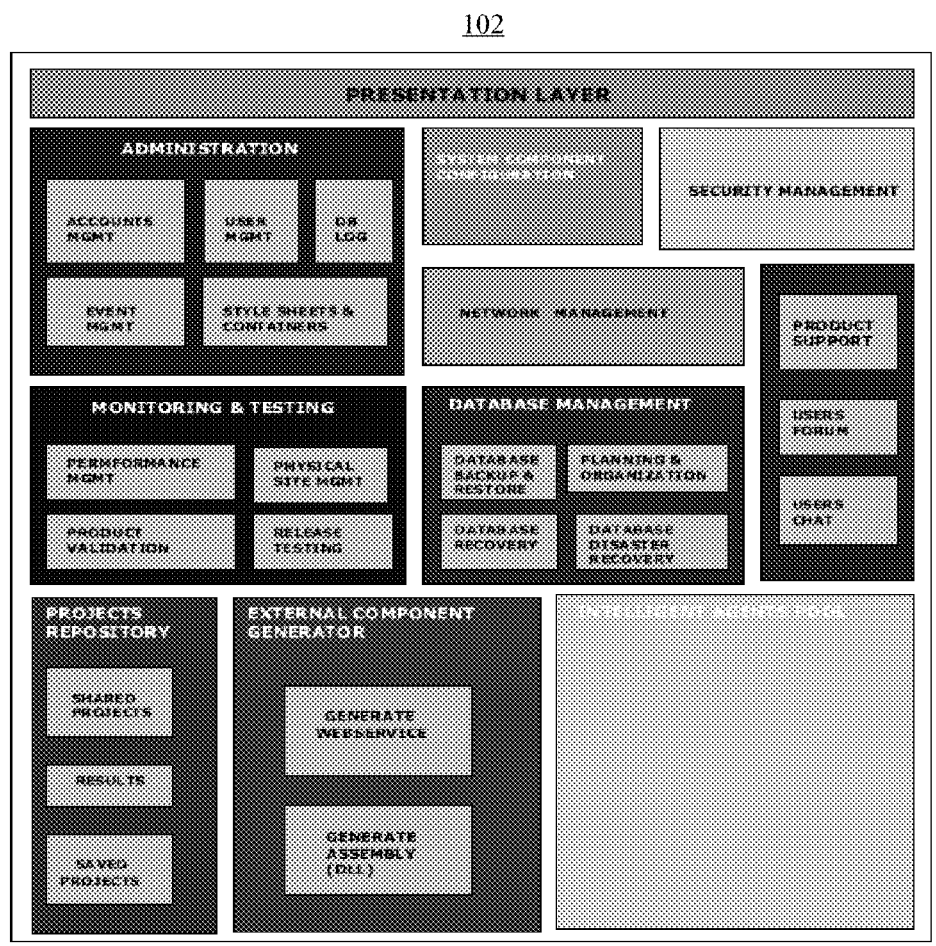
FIG. 11 is a block diagram of an example of a platform according to an embodiment.
Figure 13:
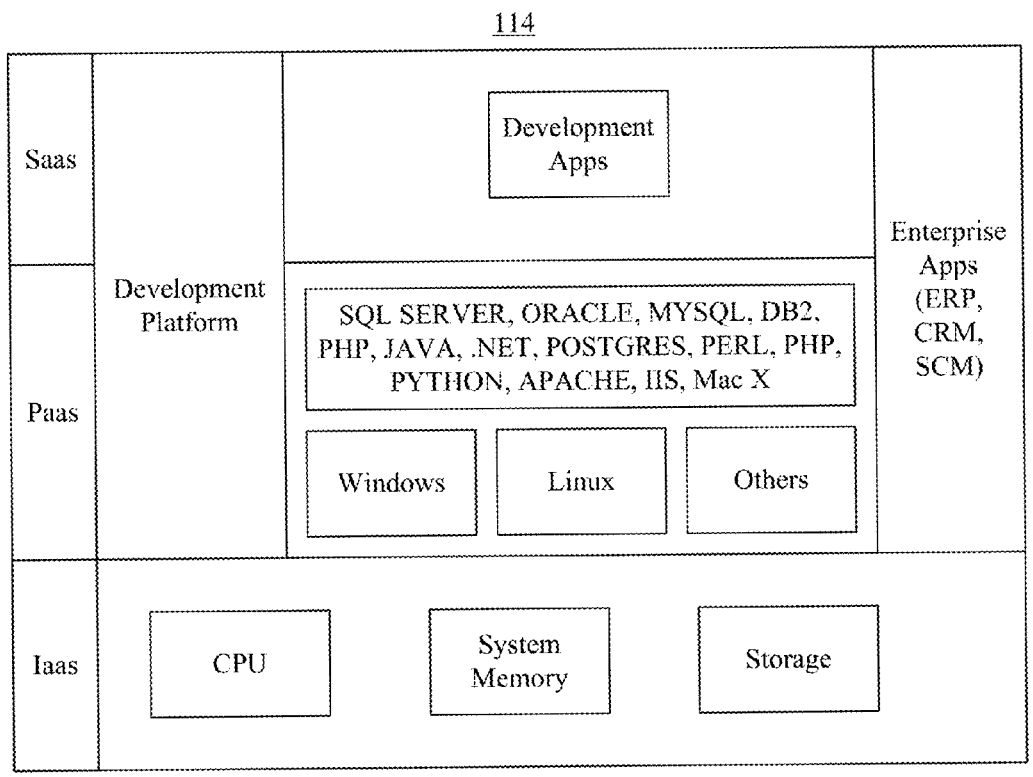
FIG. 13 is a block diagram of an example of an application development model according to an embodiment.
Figure 14:
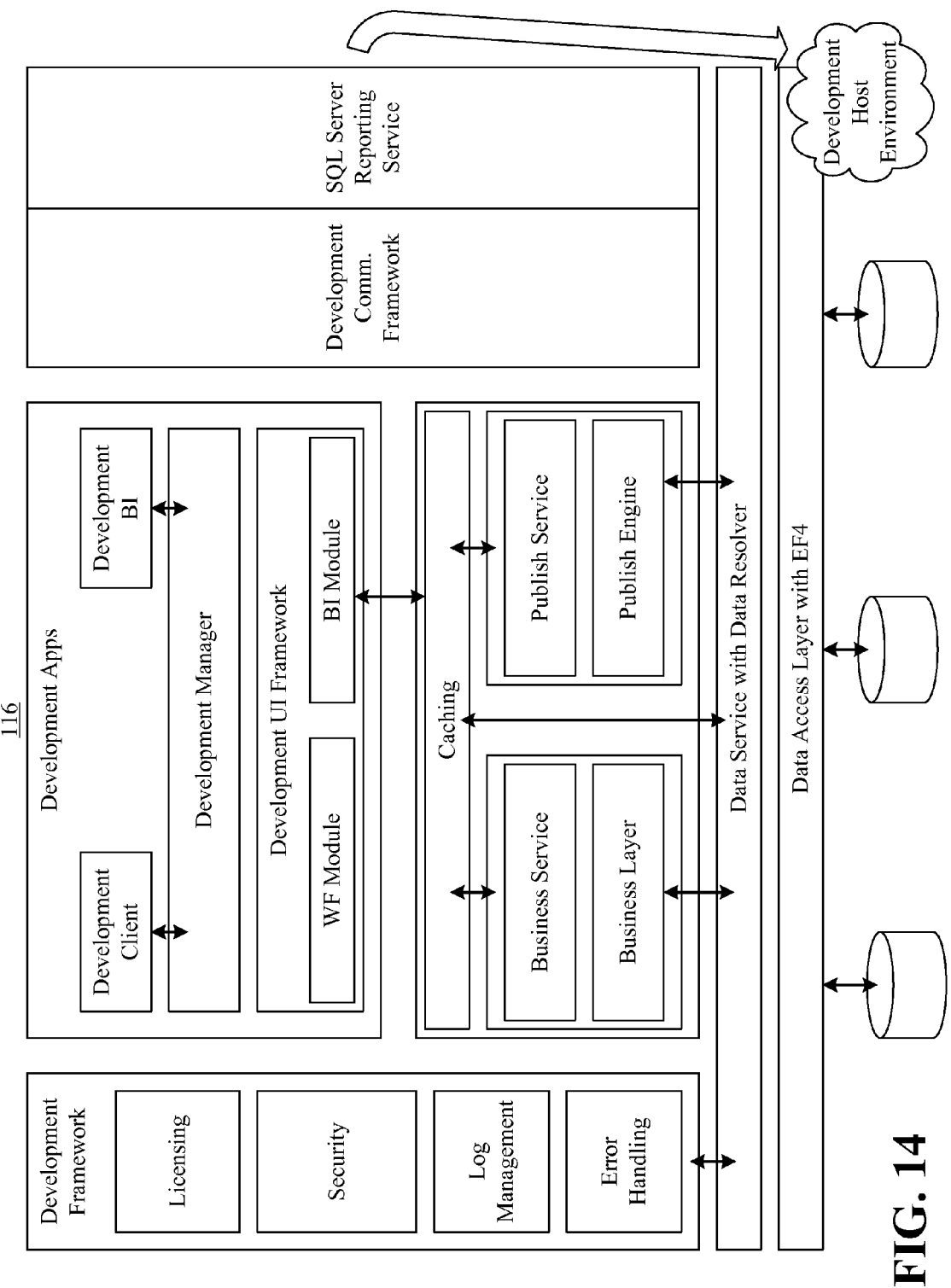
FIG. 14 is a block diagram of an example of an application development core architecture according to an embodiment.

FIG. 11 shows a platform 102 that might be implemented as part of the servers 92, 94 (FIG. 10) and/or UE devices 96, 98 (FIG. 10). Additionally, FIG. 13 shows an application development model 114 in which a development platform provides platform as a service (Paas) and software as a service (Saas) functionality to one or more enterprise applications. Moreover, an infrastructure as a service (IaaS) layer may be implemented through other components such as CPUs, system memory and mass storage. FIG. 14 demonstrates that an application development core architecture 116 may involve the use of a development framework that incorporates licensing, security, log management, and error handling components. These components, along with various business, publishing and caching components, can link to a data access layer with EF4 (entity framework) via a data service with data resolver. The core architecture may also communicate with the host environment (e.g., VisualStudio.net, Eclipse, etc.) through an application development communication framework and/or reporting service. Indeed, reusable web services may be readily plugged into such pre-existing application development environments as appropriate.

As a result of usage of such a web-based application development platform, users can create/assemble/generate both traditional & non-traditional software applications/services to perform a specific business functions or operations. Moreover, non-traditional software components are sharable web services (also known as web parts) which can be used to create/generate a composite application.

Case Study

For example, the above-described techniques might be used to develop an application to manage cargo parcels. In particular, there may be a requirement to count, analyze, and search cargo parcels on a daily, monthly and hourly basis, wherein each person and the stations involved report cargo processing events via email. There might also be a requirement to save the complete data in a centralized system and generate reports. In such a situation, absent an automated application, it may be necessary to have one or more employees read all the emails and sort the data according to the stations, parcel packs received, to and from stations etc. Using the techniques described herein, however, an application can be developed in any of the traditional programming environments and/or languages without the relatively high cost of assigning multiple developers over a couple of months. Indeed, aspects of the approaches described herein can enable such an application to be generated in a fraction of the time. Moreover, after the development and application setup, maintenance may be negligible, which can further save on the man power required.

In particular, the developed application might involve the following:

Step 1: Create the variables required.

Step 2: Monitor the reception of email in predefined intervals. Read emails and the data after reception. Save the data into the data records and insert it into the database (can be any type of database such as a SQL server, Oracle database, Access database, spreadsheet).

Step 3: Insert data into the tables/spreadsheets according to the stations. Insert the total number of parcels from a station (e.g., total weight, amount received, etc.)

Step 4: Generate reports, send information to the stations such as how many parcels are dispatched to the station, at what time it will reach, etc.

The agents/services used in development might therefore include: Application, Process, Data Assignment, Email, Condition, Repetition, Data Connector, Database operations, and Charting. If a report in spreadsheet format is desired, the Excel Connect agent/Service could also be used.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A computer implemented method comprising:
   prompting a user for design input;
   receiving the design input via a platform independent web-based user interface, wherein the input identifies a plurality of different types of application logic, a plurality of different types of data repositories, and access permission information corresponding to the plurality of different types of data repositories;
   using one or more automated processes to automatically generate a web service based at least in part on the design input, wherein generation of the web service includes a creation of a new runtime environment having one or more executable components or dynamic linked libraries; and
   constructing a plurality of different inter-application workflows based at least in part on the web service, wherein the web service includes one or more of a reusable web service or a standalone web application.

2. The method of claim 1, wherein the design input includes at least one of web-connector service input, web interaction service input, data assignment service input, comparison service input, grouped management service input, aggregation service input, email management input corresponding to at least one of an email message transmission and an email message receipt, and database operations service input.

3. The method of claim 1, further including plugging the reusable web service into a pre-existing application development environment.

4. The method of claim 3, wherein the pre-existing application development environment includes at least one of a VisualStudio.net environment and an Eclipse environment.

5. A non-transitory machine readable storage medium comprising a set of instructions which, if executed by a processor, cause a computer to:
   receive design input via a web-based user interface, wherein the design input is to identify a plurality of different types of application logic and one or more data repositories;
   use one or more automated processes to automatically generate a web service based at least in part on the design input, wherein generation of the web service is to include a creation of a new runtime environment having one or more executable components or dynamic linked libraries; and
   construct an inter-application workflow based at least in part on the web service, wherein the web service is to include one or more of a reusable web service or a standalone web application.

6. The medium of claim 5, wherein the instructions, if executed, cause a computer to prompt a user for the design input.

7. The medium of claim 5, wherein the instructions, if executed, cause a computer to construct a plurality of different application workflows based at least in part on the reusable web service.

8. The medium of claim 5, wherein the design input is to identify a plurality of different types of data repositories and corresponding access permission information.

9. The medium of claim 5, wherein the design input is to include at least one of web-connector service input, web interaction service input, data assignment service input, comparison service input, grouped data management service input, aggregation service input, email management input and database operations service input.

10. The medium of claim 9, wherein the email management input is to correspond to at least one of an email message transmission and an email message receipt.

11. The medium of claim 5, wherein the instructions, if executed, cause a computer to plug the reusable web service into a pre-existing application development environment.

12. The medium of claim 11, wherein the pre-existing application development environment includes at least one of a VisualStudio.net environment and an Eclipse environment.

13. A system comprising:
   a processor; and
   a machine readable storage medium including a set of instructions which, if executed by the processor, cause the system to,
      receive design input via a web-based user interface, wherein the user input is to identify a plurality of different types of application logic and one or more data repositories,
      use one or more automated processes to automatically generate a web service based at least in part on the design input, wherein generation of the web service is to include a creation of a new runtime environment having one or more executable components or dynamic linked libraries, and
      construct an inter-application workflow based at least in part on the web service, wherein the web service is to include one or more of a reusable web service or a standalone web application.

14. The system of claim 13, wherein the instructions, if executed, cause a computer to prompt a user for the design input.

15. The system of claim 13, wherein the instructions, if executed, cause a computer to construct a plurality of different application workflows based at least in part on the reusable web service.

16. The system of claim 13, wherein the design input is to identify a plurality of different types of data repositories and corresponding access permission information.

17. The system of claim 13, wherein the design input is to include at least one of web-connector service input, web interaction service input, data assignment service input, comparison service input, grouped data management service input, aggregation service input, email management input and database operations service input.

18. The system of claim 17, wherein the email management input is to correspond to at least of an email message transmission and an email message receipt.

19. The system of claim 13, wherein the instructions, if executed, cause a computer to plug the reusable web service into a pre-existing application development environment.

20. The system of claim 19, wherein the pre-existing application development environment includes at least one of a VisualStudio.net environment and an Eclipse environment.

* * * * *